(12) United States Patent
Watanabe

(10) Patent No.: US 8,692,875 B2
(45) Date of Patent: Apr. 8, 2014

(54) BIOMETRIC DATA ACQUIRING DEVICE AND BIOMETRIC AUTHENTICATION DEVICE

(75) Inventor: Masaki Watanabe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 371 days.

(21) Appl. No.: 13/235,131

(22) Filed: Sep. 16, 2011

(65) Prior Publication Data

US 2012/0007976 A1 Jan. 12, 2012

Related U.S. Application Data

(63) Continuation of application No. PCT/JP2009/055352, filed on Mar. 18, 2009.

(51) Int. Cl.
G05B 19/00 (2006.01)
H04N 9/47 (2006.01)
H04N 7/18 (2006.01)
G06K 9/00 (2006.01)

(52) U.S. Cl.
USPC ............. 348/77; 340/5.83; 382/115; 382/119

(58) Field of Classification Search
USPC .......................................................... 348/77
See application file for complete search history.

(56) References Cited

U.S. PATENT DOCUMENTS

| 5,526,436 | A | 6/1996 | Sekiya |
| 6,091,838 | A | 7/2000 | Burrows et al. |
| 2001/0055412 | A1 | 12/2001 | Burrows et al. |
| 2002/0056812 | A1 | 5/2002 | Burrows et al. |
| 2003/0025897 | A1 | 2/2003 | Iwai |
| 2006/0204132 | A1 | 9/2006 | Fukuda et al. |
| 2007/0058841 | A1 | 3/2007 | Miura et al. |
| 2007/0274574 | A1* | 11/2007 | Boult et al. ................... 382/119 |
| 2010/0021014 | A1* | 1/2010 | Bebis ............................. 382/115 |
| 2010/0127827 | A1* | 5/2010 | Watanabe .................... 340/5.83 |

FOREIGN PATENT DOCUMENTS

| JP | 4-277874 | 10/1992 |
| JP | 7-21348 | 1/1995 |
| JP | 2002-532808 | 10/2002 |
| JP | 2003-50993 | 2/2003 |
| JP | 2004-185276 | 7/2004 |

(Continued)

OTHER PUBLICATIONS

International Search Report, mailed May 12, 2009, in International Application No. PCT/JP2009/055352 (2 pp.).

Primary Examiner — Christopher S Kelley
Assistant Examiner — Hee-Yong Kim
(74) Attorney, Agent, or Firm — Staas & Halsey LLP

(57) ABSTRACT

An organism information acquisition device is provided with an imaging part which images a user's hand opened and the user's hand bent to acquire a first image and a second image respectively; a dark line extraction part which extracts dark lines from the first image and the second image; a dark line element feature extraction part which extracts the darkness and width of the dark lines extracted by the dark line extraction part from the first image and the second image; and a surface information judgment part which extracts the dark lines being surface information relating to the hand on the basis of the darkness of the dark line in the first image, the deepness of the dark line in the second image, the width of the dark line in the first image, and the width of the dark line in the second image.

8 Claims, 14 Drawing Sheets

(56) References Cited

FOREIGN PATENT DOCUMENTS

| JP | 2004-255212 | 9/2004 |
|---|---|---|
| JP | 2005-182332 | 7/2005 |
| JP | 2006-098340 | 4/2006 |
| JP | 2006-99700 | 4/2006 |
| JP | 2006-244234 | 9/2006 |
| JP | 2006-312064 | 11/2006 |
| JP | 2007-75305 | 3/2007 |
| JP | 2007-219625 | 8/2007 |
| JP | 2008-217307 | 9/2008 |
| JP | 2008-305427 | 12/2008 |

* cited by examiner

BIOMETRIC DATA ACQUIRING DEVICE AND BIOMETRIC AUTHENTICATION DEVICE

CROSS-REFERENCE TO RELATED APPLICATIONS

This is a continuation of Application, filed under 35 U.S.C. §111 (a) of International Application PCT/JP2009/055352, filed on Mar. 18, 2009, the contents of which are herein wholly incorporated by reference.

FIELD

The present invention relates to a biometric data acquiring device and a biometric authentication device, which utilize a hand.

BACKGROUND

A hand has surface data derived from wrinkles on the hand, which is called a palmar pattern or lines on the palm in palmistry. Further, a finger joint also has finger surface data derived from bending and stretching the finger. The following technology is exemplified as a technology of acquiring surface data of the hand.

There is a technology which is targeted mainly at the finger and uses two images, i.e., an image captured by utilizing transmitted beam and an image captured by utilizing reflected light. A larger quantity of surface data is taken in the image captured by utilizing the reflected light than in the image capture by utilizing the transmitted light. Such being the case, the surface data of an object can be specified by taking a difference between the two images.

Further, an object having unevenness (concave/convex portions) is illuminated with light beams in different directions, with the result that different shadows are formed. A target object is imaged by making use of this phenomenon in a manner that utilizes a plurality of illuminations which is different in any one or plural elements among an intensity of the illumination light, a direction of the illumination light, a wavelength of the illumination light, an imaging direction and a period of imaging time. The surface data of the target object can be specified by analyzing a difference between these captured images.

[Patent document 1] Japanese Patent Application Laid-Open Publication No. 2004-255212
[Patent document 2] Japanese Patent Application Laid-Open Publication No. 2006-244234
[Patent document 3] Japanese Patent Application Laid-Open Publication No. 2004-185276
[Patent document 4] Japanese Patent Application Laid-Open Publication No. H04-277874
[Patent document 5] Japanese Patent Application Laid-Open Publication No. 2003-50993
[Patent document 6] Japanese Patent Application Laid-Open Publication No. 2006-99700

SUMMARY

It prevails that the surface data of the target object is acquired by irradiating the target object with the light beams from a plurality of illuminations. A device including the plurality of illuminations becomes complicated in terms of a configuration of illumination units. Hence, there rises a cost for the illumination units in manufacturing the device for acquiring the surface data by irradiating the target object with the light beams from the plurality of illuminations.

It is an object of the present invention to provide a biometric data acquiring device which acquires surface data of a hand with a simple configuration.

MEANS FOR SOLVING THE PROBLEMS

A biometric data acquiring device of the disclosure adopts the following means in order to solve the problems described above.

Namely, according to a first mode, a biometric data acquiring device includes: an imaging unit to acquire a first image of an internal side of a user's hand captured in a first state in which the internal side of the hand is stretched, and a second image of the internal side of the user's hand captured in a state in which the internal side of the hand is bent; a dark line extracting unit to extract dark lines (black lines) from the first image and the second image, respectively; a dark line element characteristic extracting unit to extract a characteristic of an element of the dark line in the first image and a characteristic of an element of the dark line in the second image; and a surface data determining unit to extract the dark line derived from a wrinkle formed based on bending and stretching the hand on the basis of transitions of the characteristics of the elements of the dark lines in the first image and the second image.

EFFECTS OF THE INVENTION

According to the invention of the disclosure, it is feasible to provide the biometric data acquiring device which acquires the surface data of the hand with the simple configuration.

Figure 1:
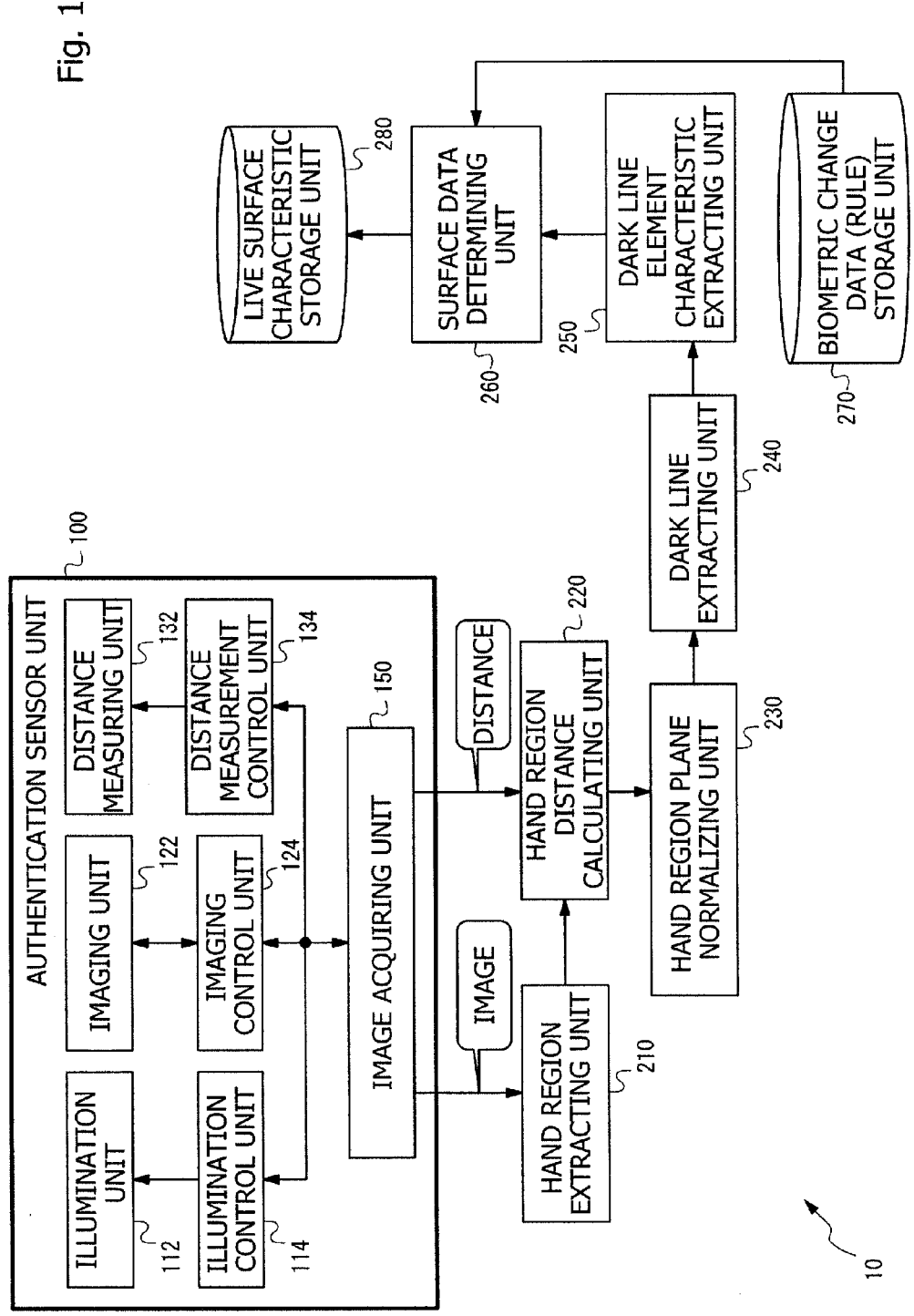
FIG. 1 is a block diagram illustrating an example of a configuration of a biometric data acquiring device in an embodiment.

REFERENCE SIGNS LIST 2A stretched hand
2B bent hand
10 biometric data acquiring device
100 authentication sensor unit
112 illumination unit
114 illumination control unit
122 imaging unit
122A lens
122B imaging element
124 imaging control unit
132 distance measuring unit
134 distance measurement control unit
150 image acquiring unit
210 hand region extracting unit
220 hand region distance calculating unit
230 hand region plane normalizing unit
240 dark line extracting unit
250 dark line element characteristic extracting unit
260 surface data determining unit
270 biometric change data storage unit
280 live surface characteristic storage unit
500 vein authentication unit
600 determining unit
700 storage unit
1000 biometric authentication device

DESCRIPTION OF EMBODIMENTS

An embodiment will hereinafter be described with reference to the drawings. A configuration in the embodiment is an exemplification, and the present invention is not limited to the configuration in the embodiment.

Embodiment

It is known that surface data of a hand, which is derived from wrinkles on the hand, changes depending on habits and environments of one's living. Accordingly, it is difficult to utilize the surface data of one's hand by way of identification information throughout an individual life.

On the other hand, it does not normally happen that the surface data of the hand, though changeable, largely changes in a period of time that is as short as one or two days. Accordingly, the surface data of the hand can be, if an interval between registration time and matching time is short, utilized as temporarily-usable authentication data for biometric authentication.

(Configuration)

FIG. 1 is a diagram illustrating an example of a configuration of a biometric data acquiring device in the embodiment. A biometric data acquiring device 10 in FIG. 1 includes an authentication sensor unit 100, a hand region extracting unit 210, a hand region distance calculation unit 220, a hand region plane normalizing unit 230 and a dark line extracting unit 240. The biometric data acquiring device 10 further includes a dark line element characteristic extracting unit 250, a surface data determining unit 260, a biometric change data storage unit 270 and a live surface characteristic storage unit 280.

The hand region extracting unit 210, the hand region distance calculation unit 220, the hand region plane normalizing unit 230, the dark line extracting unit 240, the dark line element characteristic extracting unit 250 and the surface data determining unit 260 can be realized hardwarewise and softwarewise as well.

Two or more components among these components may function as one processing unit. The single component among these components may function as a plurality of processing units. This arrangement is similarly applied to the components which will be described later on.

The authentication sensor unit 100 of the biometric data acquiring device 10 includes an illumination unit 112, an illumination control unit 114, an imaging unit 122, an imaging control unit 124, a distance measuring unit 132, a distance measurement control unit 134 and an image acquiring unit 150. The authentication sensor unit 100 can be used as an authentication sensor for vein authentication.

The illumination control unit 114, the imaging control unit 124, the distance measurement control unit 134 and the image acquiring unit 150 can be realized hardwarewise and softwarewise as well.

The imaging unit 122 is capable of imaging the hand of a user. The imaging unit 122 includes at least a lens 122A and an imaging element 122B. The imaging element 122B of the imaging unit 122 involves using, e.g., a CCD image sensor (Charge Coupled Device Image Sensor) but is not limited to the CCD image sensor. The imaging element 122B of the imaging unit 122 can also involve using other types of imaging elements such as a CMOS image sensor (Complementary Metal Oxide Semiconductor Image Sensor).

The imaging control unit 124 instructs the imaging unit 122 to capture an image of the hand directed to the imaging unit 122. The imaging control unit 124 can instruct the imaging unit 122 to capture images of the hand in plural states, which is directed to the imaging unit 122.

Figure 2:
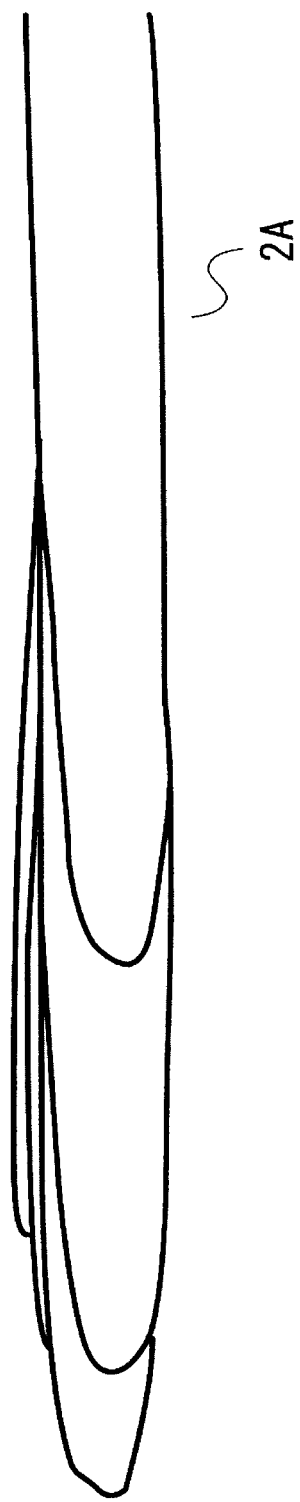
FIG. 2 is a view illustrating an example of a hand-expanded state.
Figure 3:
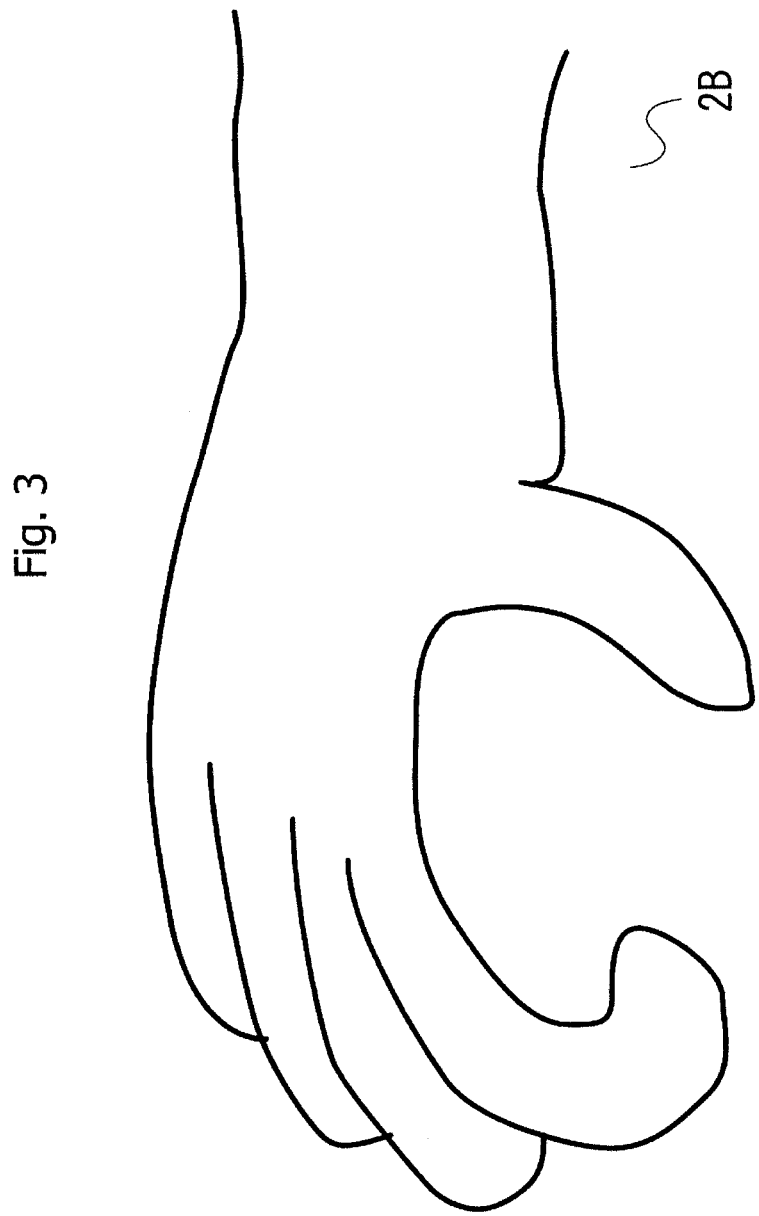
FIG. 3 is a view illustrating an example of a hand-bent state.

FIG. 2 is a view illustrating a state where the internal side of the hand expands. A hand 2A in FIG. 2 represents a hand in the state where the internal side of the hand gets stretched. As in FIG. 2, in the state where the internal side of the hand expands (the internal side of the hand gets stretched), a surface shape of the internal side of the hand becomes substantially flat FIG. 3 is a view depicting the hand in a state where the internal side of the hand gets bent. A hand 2B in FIG. 3 represents a hand in the state where the internal side of the hand gets bent. As in FIG. 3, in the state where the internal side of the hand gets bent (the state where the internal side of the hand becomes flexural), the surface shape of the internal side of the hand is equal to a curved surface.

The illumination unit 112 switches ON or OFF its light under the control of the illumination control unit 114. The illumination unit 112 can involve using an incandescent lamp, a fluorescent tube, an LED (Light Emitting Diode), etc but is not limited to these lighting elements. An intensity of the illumination of the illumination unit 112 is set to reach only a near-distance range (which is equal to or smaller than, e.g., 10 cm) from the illumination unit 112. The illumination unit 112 enables only the hand directed to the authentication sensor unit 100 to be illuminated with the light by setting the intensity of the illumination so as to reach only the near-distance range from the illumination unit 112.

The illumination control unit 114 controls the illumination unit 112 so as to switch ON or OFF its light when acquiring (capturing) the image of the hand. Further, the illumination control unit 114 can, when measuring the distance up to the hand, instruct the illumination unit 112 to switch OFF the light.

The distance measurement control unit 134 instructs, when measuring the distance up to the hand, the distance measuring unit 132 to irradiate the hand with a light beam. The distance measurement control unit 134 is, the distance measuring unit 132 irradiating the light beam in a predetermined direction, thereby capable of measuring the distance up to the hand.

The distance measuring unit 132 irradiates, based on the control of the distance measurement control unit 134, the hand with the light beam. The distance measuring unit 132 can involve using a laser light source etc but is not limited to this light source. The distance measuring unit 132 may be configured as a plurality of laser light sources or the like. The distance measuring unit 132 is installed so that the hand is irradiated with at least one streak of light beam. The direction of light beam from the distance measuring unit 132 may be fixed and may also be variable.

The image acquiring unit 150 instructs the illumination control unit 114, the imaging control unit 124 and the distance measurement control unit 134 to acquire the image of the hand or to measure the distance up to the hand. The image acquiring unit 150 prompts the user to direct the internal side of the hand toward the authentication sensor unit 100. The image acquiring unit 150 can prompt the user to direct the internal side of the hand toward the authentication sensor unit 100 in the state where the internal side of the hand gets stretched and in the state where the internal side of the hand gets bent. The image acquiring unit 150 receives the captured image from the imaging control unit 124 and transmits the image to the hand region extracting unit 210. Further, the image acquiring unit 150 receives, from the imaging unit 122, the image captured by the imaging unit 122 in a way that irradiates the light beam from the distance measuring unit 132. The image acquiring unit 150 calculates a distance between the plane on which the imaging unit 122 exists and a position in which to irradiate the light beam, and transmits the distance to the hand region distance calculation unit 220.

The hand region extracting unit 210 extracts the hand parts from the image received from the image acquiring unit 150. The hand region can be obtained from a difference between the image captured by applying the illumination from the illumination unit 112 and the image captured by not applying the illumination from the illumination unit 112. The hand region extracting unit 210 transmits the thus-extracted image of the hand to the hand region distance calculation unit 220.

The hand region extracting unit 210 extracts the hand region with respect to the internal side-stretched state of the hand and the internal side-bent state of the hand, respectively.

The hand region distance calculation unit 220 receives, from the hand region extracting unit 210, the hand's image extracted by the hand region extracting unit 210. The hand region distance calculation unit 220 receives the distance between the plane on which the imaging unit 122 exists and the position in which to irradiate the light beam from the image acquiring unit 150 of the authentication sensor unit 100. The hand region distance calculation unit 220 calculates respective distances between the plane on which the imaging unit 122 exists and all of the points of the hand region (hand parts) on the captured image. A three-dimensional shape of the hand is recognized from these distances.

The hand region distance calculation unit 220 calculates the distances between the plane on which the imaging unit 122 exists and all of the points of the hand on the captured image with respect to the internal side-stretched state of the hand and the internal side-bent state of the hand, respectively.

The hand region plane normalizing unit 230 normalizes the plane by applying the hand's distance data calculated by the hand region distance calculation unit 220 to a proper model. The model to be applied can involve using, e.g., an elliptic paraboloid.

The hand region plane normalizing unit 230 normalizes the plane by applying the hand's distance data to the proper model with respect to the internal side-stretched state of the hand and the internal side-bent state of the hand.

The dark line extracting unit 240 extracts dark lines (black lines) from the image of the hand. The dark lines of the image of the hand represent dark linear regions of the image of the hand. The dark lines of the image of the hand contain a palmar pattern of a palm and wrinkles of finger joints.

The dark line element characteristic extracting unit 250 extracts characteristics of the dark line elements of the hand's image. The dark line elements of the hand's image include a width and a density of the dark line.

The surface data determining unit 260 determines, based on the characteristics of the dark line elements of the hand's image that are extracted by the element characteristic extracting unit 250, whether the extracted dark line corresponds to the surface data of the hand or not. The surface data determining unit 260 can utilize, as a criterion for determination, the data stored in the biometric change data storage unit 270. The surface data determining unit 260 can determine whether or not the extracted dark line corresponds to the surface data of the hand by use of, e.g., changes in width and in density of the dark line of the image of the hand.

The biometric change data storage unit 270 is stored with the determination criterion (rule) used when the surface data determining unit 260 determines whether the extracted dark line corresponds to the surface data of the hand or not.

The live surface characteristic storage unit 280 is stored with a result of the determination made by the surface data determining unit 260. Further, the live surface characteristic storage unit 280 is stored with the surface data of the hand.

Operational Example

Figure 4:
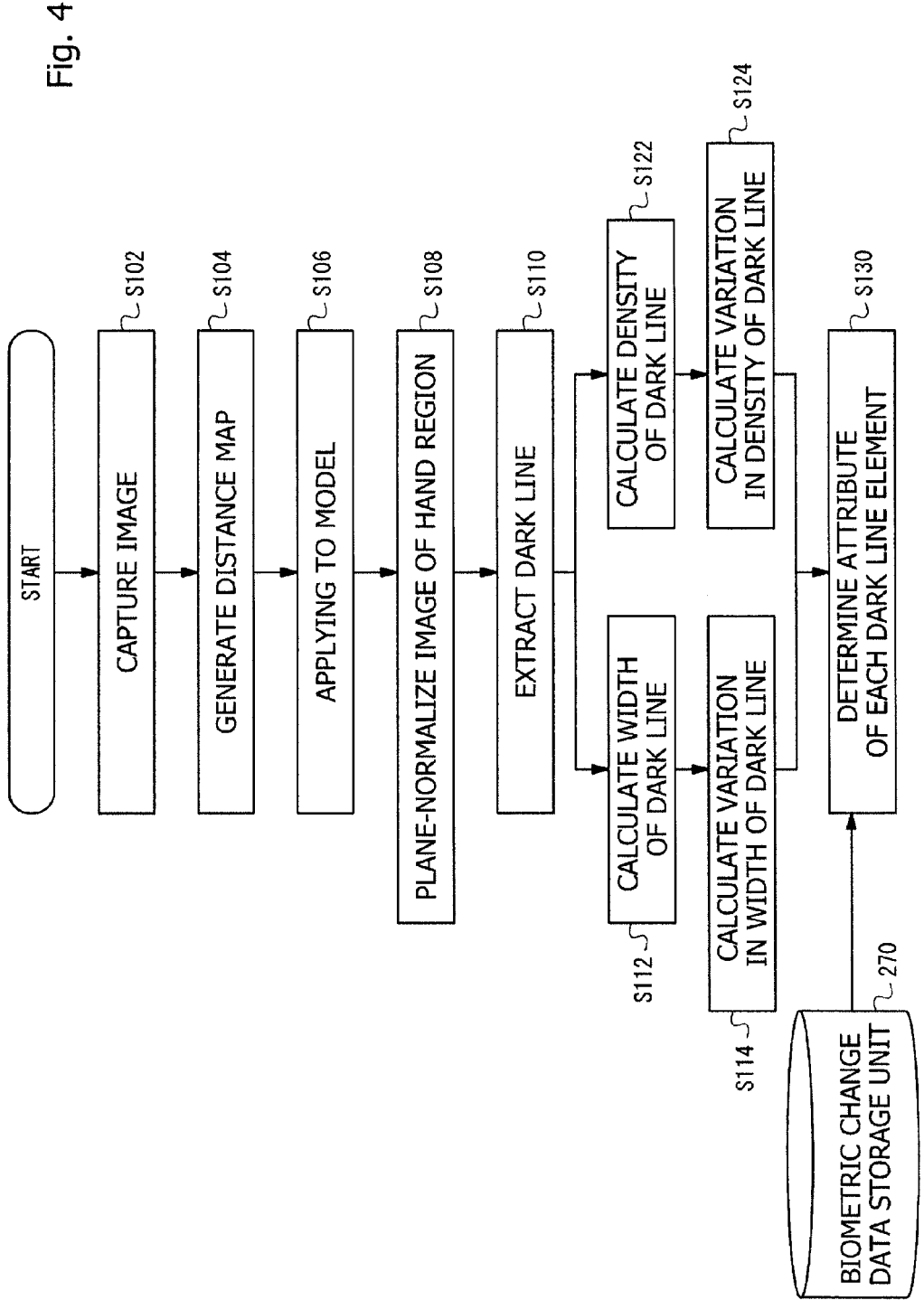
FIG. 4 is a flowchart illustrating an operation flow of the whole biometric data acquiring device in the embodiment.

FIG. 4 is a flowchart illustrating an operation flow of the whole biometric data acquiring device in the embodiment.

The image acquiring unit 150 of the authentication sensor unit 100 instructs the illumination control unit 114, the imaging control unit 124 and the distance measurement control unit 134 to capture the image of the hand. The image acquiring unit 150 prompts the user to direct the internal side of the hand toward the authentication sensor unit 100. The image acquiring unit 150 can prompt the user to direct the hand in the plurality of states toward the authentication sensor unit 100. The image acquiring unit 150 uses the imaging unit 122 to capture the image of the hand in a way that irradiates the hand with the light beam emitted from the distance measuring unit 132. Further, the image acquiring unit 150 uses the imaging unit 122 to capture the image of the hand in a way that applies the illumination over the hand from the illumination unit 112. Still further, the image acquiring unit 150 uses the imaging unit 122 to capture the image of the hand in a state of switching OFF the lights of the illumination unit 112 and of the distance measuring unit 132 (S102).

Moreover, the image acquiring unit 150 calculates the distance between the plane on which the imaging unit 122 exists and the position in which to irradiate the light beam.

The hand region extracting unit 210 receives, from the image acquiring unit 150, the image captured by applying the illumination over the hand from the illumination unit 112. Further, the hand region extracting unit 210 receives, from the image acquiring unit 150, the captured image of the hand in the state of switching OFF the lights of the illumination unit 112 and of the distance measuring unit 132. The illumination from the illumination unit 112 reaches only within the near-distance range, and hence portions (corresponding to background portions) other than the hand are not illuminated with the light. Therefore, the hand region extracting unit 210 obtains a difference between both of the acquired images, thereby enabling the hand region to be extracted.

The hand region distance calculation unit 220 receives, from the hand region extracting unit 210, the hand's image extracted by the hand region extracting unit 210. The hand region distance calculation unit 220 receives, from the image acquiring unit 150 of the authentication sensor unit 100, the distance between the plane on which the imaging unit 122 and the light beam source exist and the position in which to irradiate the light beam. The hand region distance calculation unit 220 calculates the distances between the plane on which the imaging unit 122 and the light beam source exist and the respective points of the hand region (hand parts) (S104). The hand region distance calculation unit 220 transmits, to the hand region plane normalizing unit 230, an aggregation of the distances between the plane on which the imaging unit 122 exists and the respective points of the hand region as a distance map of the hand.

The hand region plane normalizing unit 230 applies the hand distance map received from the hand region distance calculation unit 220 to a model. The hand region plane normalizing unit 230 adopts, e.g., the elliptic paraboloid as the model and applies the distance map of the hand to this model (S106).

The hand region plane normalizing unit 230 plane-normalizes the elliptic paraboloid to which the distance map of the hand is applied (S108). The "plane-normalization" implies changing the shape of the image so as to attain the plane by stretching and expanding the curved surface.

The dark line extracting unit 240 extracts the dark lines from the image of the hand region undergoing the plane-normalization in the hand region plane normalizing unit 230 (S110). The dark lines correspond to the linear portions exhibiting a low intensity (brightness) as compared with an ambient intensity in the image of the hand region.

The dark line element characteristic extracting unit 250 extracts the dark line element characteristics of every dark line extracted by the dark line extracting unit 240. Types of the dark line element characteristics are exemplified by the width and the density of the dark line.

The dark line element characteristic extracting unit 250 extracts the width of the dark line from a width of the dark line of the image of the hand region (S112). The dark line element characteristic extracting unit 250 calculates a variation in width of the dark line from the width of the dark line in the case of capturing the image of the hand of which the internal side expands and from the width of the dark line in the case of capturing the image of the hand of which the internal side is bent (S114).

The dark line element characteristic extracting unit 250 extracts the density of the dark line from the intensity of the dark line of the image of the hand region (S122). The dark line element characteristic extracting unit 250 calculates a variation in density of the dark line from the density of the dark line in the case of capturing the image of the hand of which the internal side expands and from the density of the dark line in the case of capturing the image of the hand of which the internal side is bent (S124).

The surface data determining unit 260 determines from the variation in width of the dark line and from the variation in density of the dark line whether or not the dark line represents the surface data on a per-dark-line basis (S130). The surface data determining unit 260 can, when determining whether the dark line represents the surface data or not, use the data stored in the biometric change data storage unit 270. The biometric change data storage unit 270 is stored with the data serving as the criterion for determining whether the dark line represents the surface data or not.

<Imaging>

Figure 5:
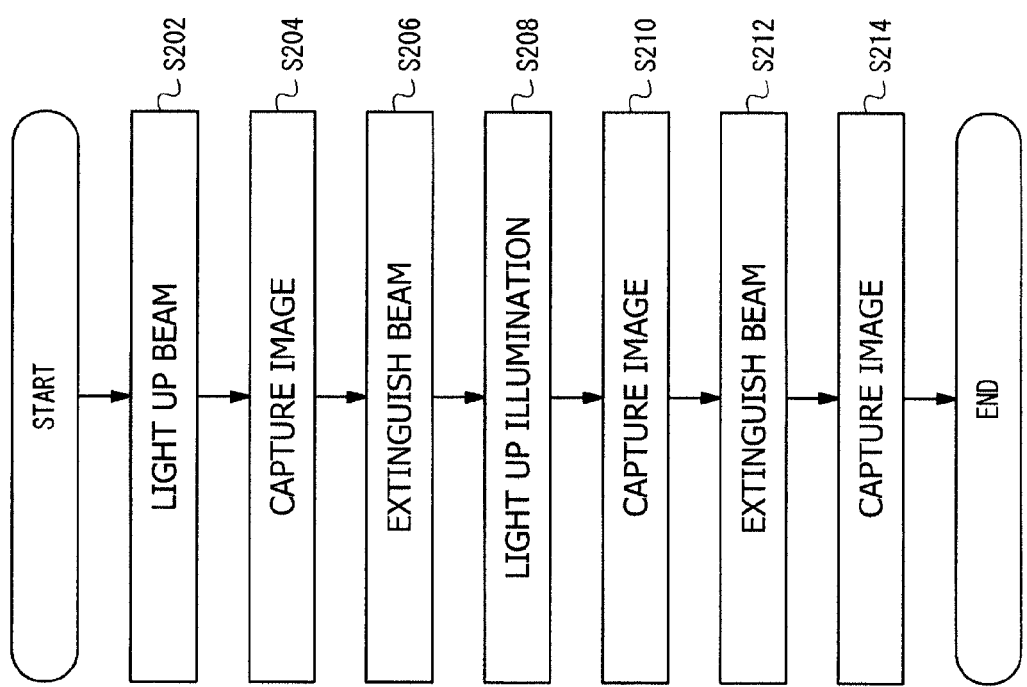
FIG. 5 is a flowchart illustrating an operation flow of capturing an image of the hand.

FIG. 5 is a flowchart illustrating an example of an operation flow for imaging the internal side of the hand. The internal side of the hand is imaged by use of the authentication sensor unit 100.

The image acquiring unit 150 prompts the user to direct the internal side of the hand toward the authentication sensor unit 100. The image acquiring unit 150 instructs the user to direct the internal side of the hand toward the authentication sensor unit 100 so as to reach within the range of the predetermined distance from the authentication sensor unit 100. At this time, the image acquiring unit 150 enables the user to specify the shape of the hand directed to the authentication sensor unit 100. The distance measuring control unit 134 instructs the distance measuring unit 132 to switch ON the light for irradiating the light beam. The distance measuring unit 132 irradiates the hand with the light beam (S202).

The imaging control unit 124 instructs the imaging unit 122 to capture an image of the hand. The imaging unit 122 captures the image of the hand (S204). Herein, the hand to be imaged is irradiated with the light beam.

The distance measuring control unit 134 instructs the distance measuring unit 132 to switch OFF the light for irradiating the light beam. The distance measuring unit 132 stops irradiating the light beam (S206).

The illumination control unit 114 instructs the illumination unit 112 to get the illumination lit up. The illumination unit 112 illuminates the hand with the light (S208). The intensity of the illumination of the illumination unit 112 is set to reach only within the near-distance range from the illumination unit 112.

The imaging control unit 124 instructs the imaging unit 122 to capture the image of the hand. The imaging unit 122 captures the image of the hand (S210). Herein, the hand to be imaged is illuminated with the light.

The illumination control unit 114 instructs the illumination unit 112 to extinguish the illumination. The illumination unit 112 extinguishes the illumination (S212).

The imaging control unit 124 instructs the imaging unit 122 to capture the image of the hand. The imaging unit 122 captures the image of the hand (S214). Herein, neither the light beam nor the illumination is applied over the hand to be imaged.

The authentication sensor unit 100 captures the image of the hand on a per-hand-state basis. For example, the image acquiring unit 150 of the authentication sensor unit 100 instructs the user to direct the internal side of the hand in the hand-expanded state toward the authentication sensor unit 100, and performs imaging based on the operation flow in FIG. 5. Further, the image acquiring unit 150 of the authentication sensor unit 100 instructs the user to direct the internal side of the hand in the palm-bent state toward the authentication sensor unit 100, and performs imaging based on the operation flow in FIG. 5.

It is desirable that the operation flow in FIG. 5 is speedily executed. This is because the hand state (shape) is kept till the imaging is finished since the start of imaging the hand in the same state.

A hand imaging sequence is not limited to the example of the operation flow in FIG. 5. For example, the imaging conducted in the state of switching OFF the lights of the illumination unit 112 and of the distance measuring unit 132 may also be carried out at the beginning. Further, the imaging in the palm-bent state may be conducted anterior to the imaging in the palm-expanded state.

A plurality of light sources may be prepared as the distance measuring unit 132. The plurality of light sources is prepared as the distance measuring unit 132, in which case the hand may be imaged by the respective imaging units 122 by irradiating the light beam in sequence on a per-light-source basis. Moreover, the direction of the light beam emitted from the distance measuring unit 132 may be variable. If the direction of the light beam emitted from the distance measuring unit 132 is variable, the hand may be imaged in every direction of the light beam.

Figure 6:
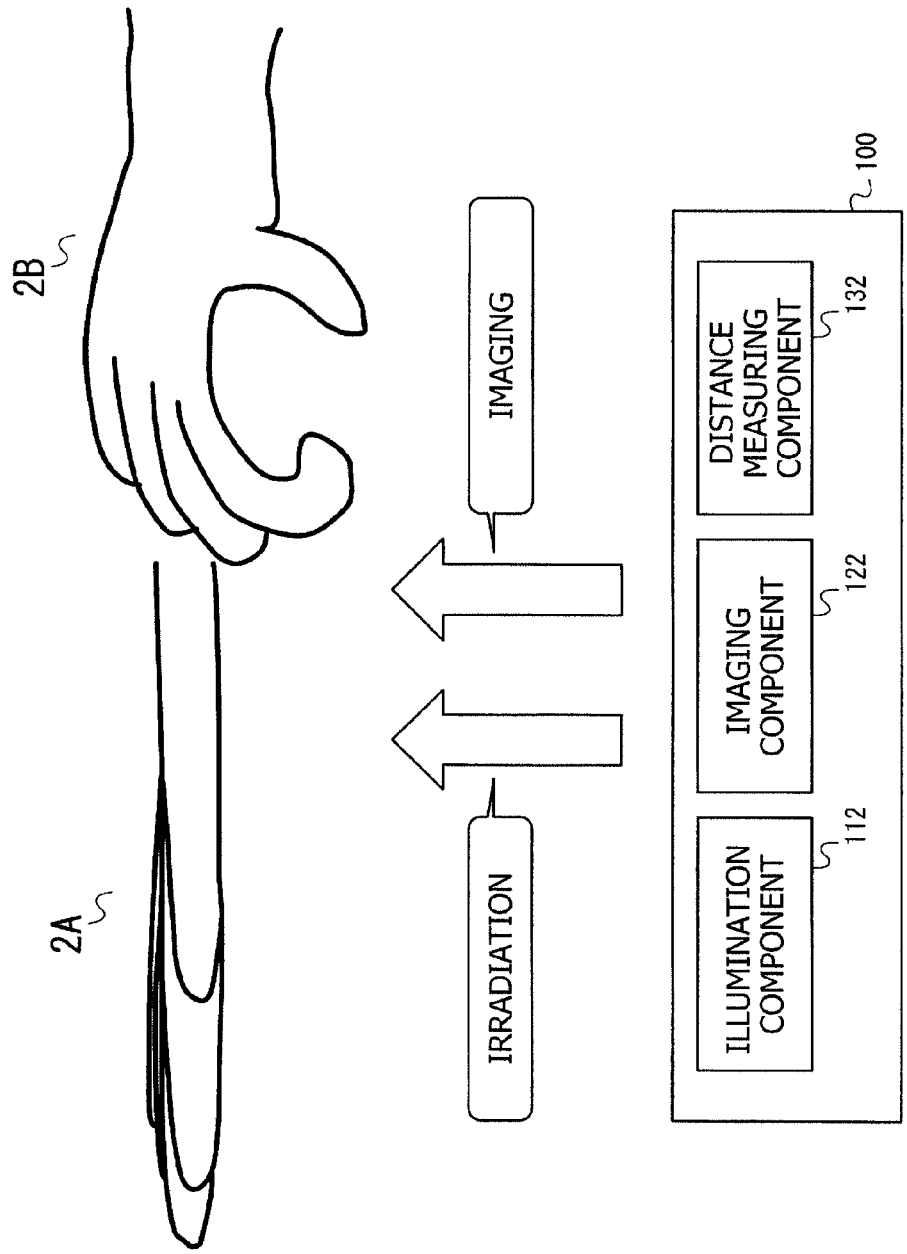
FIG. 6 is a view illustrating an authentication sensor unit and an example of the hand states.

FIG. 6 is a view illustrating authentication sensor unit and an example of the state of the hand. The authentication sensor unit 100 prompts the user to direct the internal side of the hand toward the authentication sensor unit 100, and the hand is irradiated with the laser beams emitted from the distance measuring unit 132 or illuminated with the light emitted from the illumination unit 112 and is thus imaged by the imaging unit 122. Alternatively, the lights of the distance measuring unit 132 and of the illumination unit 112 are switched OFF, in which the hand is imaged by the imaging unit 122. The authentication sensor unit 100 instructs the user to direct the hand in the hand-expanded state or the hand-bent state toward the authentication sensor unit 100.

<Extraction of Hand Region>

The hand region extracting unit 210 receives, from the image acquiring unit 150, the hand image captured in a way that gets the illumination lit up. Further, the hand region extracting unit 210 receives, from the image acquiring unit 150, the hand image captured in a way that extinguishes the illumination.

The hand region extracting unit 210 extracts the hand region from the hand images captured by switching the illumination light ON and OFF. The hand region extracting unit 210 extracts the hand region by taking a difference between the hand images captured in a manner that switches the illumination light ON and OFF.

The illumination does not reach the regions other than the hand region. Therefore, in the hand images captured by switching the illumination light ON and OFF, the regions other than the hand region are similarly imaged. Accordingly, the regions other than the hand region are removed by taking the difference between the hand images captured by switching the illumination light ON and OFF, thus enabling the hand region to be extracted.

The hand region extracting unit 210 can determine, as the hand region, the region in which the difference between the hand images captured by switching the illumination light ON and OFF exhibits the intensity equal to or larger than a predetermined level of intensity.

The hand region extracting unit 210 extracts the hand region of each of the hand in the expanding state and the hand in the bending state.

<Calculation of Distance of Hand Region>
<<Distance Calculation Using Light Beam>>

Figure 7:
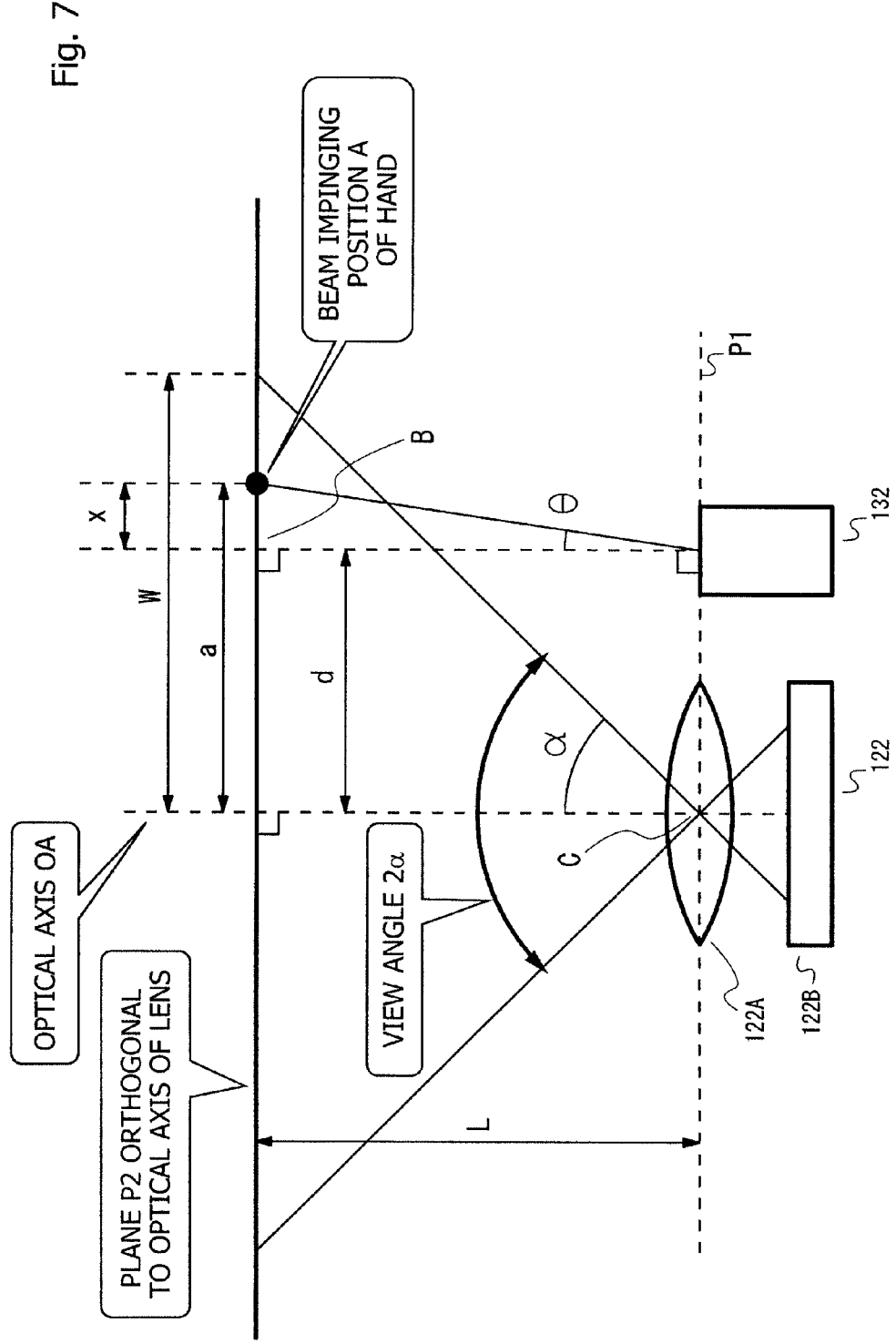
FIG. 7 is an explanatory diagram illustrating how a distance is calculated by use of light beams.

FIG. 7 is an explanatory view of how a distance is calculated by use of the light beam. The image acquiring unit 150 calculates a distance up to the plane including the position in which the light beam emitted from the imaging unit 122 impinges upon the hand in a manner that uses the hand image captured by irradiating the hand with the light beam.

The light beam source, which is defined as the distance measuring unit 132, is disposed in a position spaced at a distance d from a center C of the lens 122A within a plane P1 orthogonal to an optical axis OA of the lens 122A that embraces the center C of the lens 122A (which is a principal point of the lens) and is also spaced at the distance d from the optical axis OA of the lens 122A. The direction of the light beam of the light beam source bears within the plane including the optical axis OA and the light beam source. The direction of the light beam of the light beam source is inclined at an angle $\theta$ to the optical axis OA of the lens 122A of the imaging unit 122. Let "L" be a distance between a plane P2 orthogonal to the optical axis of the lens of the imaging unit 122 which embraces the position A of the hand upon which the light beam impinges and the center C of the lens 122A of the imaging unit 122. Let "x" be a distance between the position A of the hand upon which the light beam impinges and an intersection B with the plane P2 including the light beam impinging position A and orthogonal to the optical axis OA. A view angle of the imaging element 122B of the imaging unit 122 is set to an angle $2\alpha$. An angle $\alpha$ is a half of the view angle ($2\alpha$) of the imaging element 122B of the imaging unit 122. Let "W" be a distance that is a half of the distance on the plane P2, which is embraced by the view angle of the imaging element 122B of the imaging unit 122. The distance W on the plane P2 is a distance between the optical axis OA and an outermost portion (line segment) embraced by the view angle $2\alpha$. Let "a" be a distance between the position A and the optical axis OA.

Figure 8:
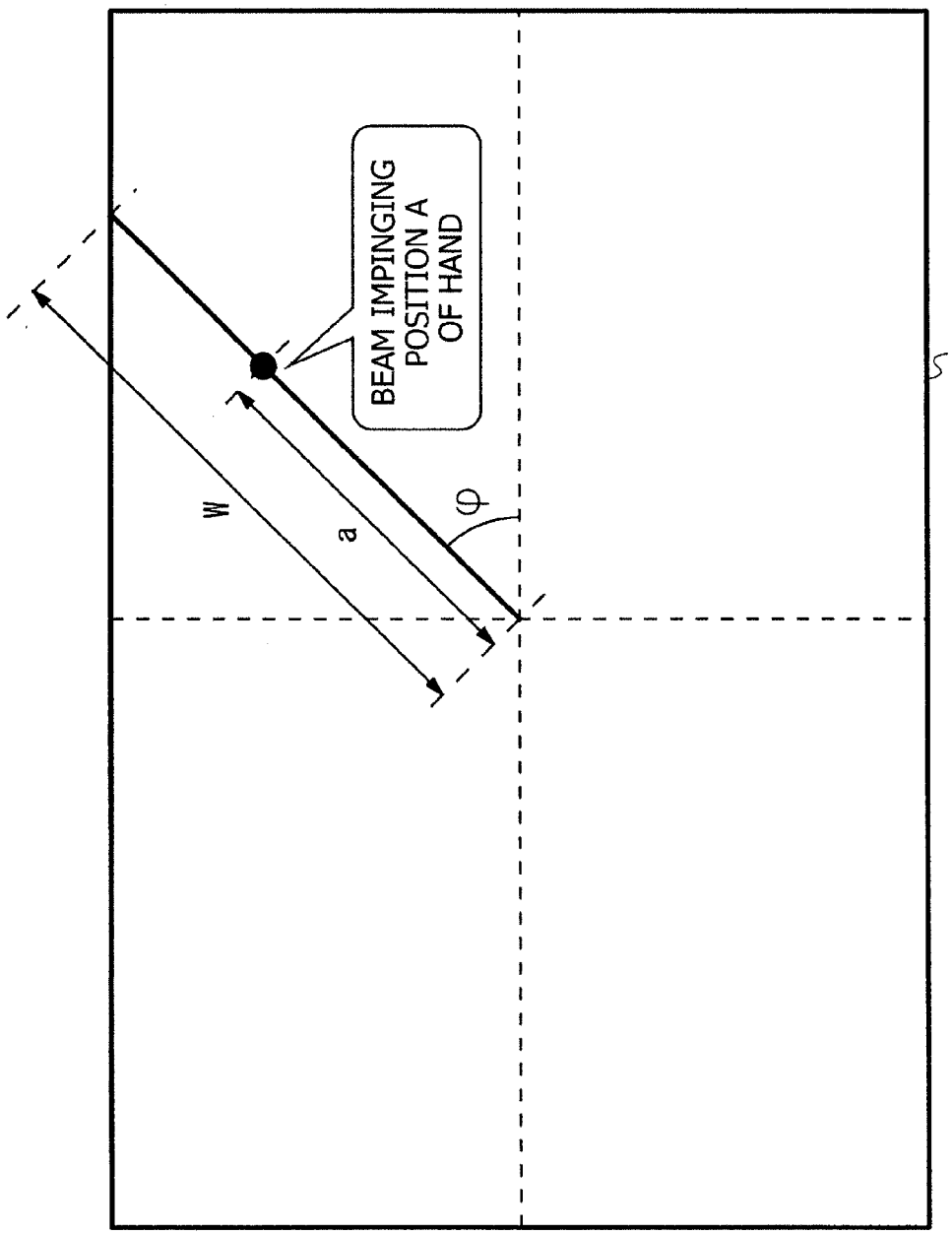
FIG. 8 is a diagram illustrating an example of an image captured by an imaging unit when a distance measuring unit irradiates the light beams.

FIG. 8 is a view illustrating an example of the image captured by the imaging unit when the distance measuring unit irradiates the hand with the light beam.

Let $\phi$ be an angle made by the plane including the optical axis OA of the lens 122A of the imaging unit 122 and the light beam source and by a horizontal axis of the image captured by the imaging unit 122. The center of the image captured by the imaging unit 122 corresponds to the position of the optical axis OA of the lens 122A of the imaging unit 122.

Herein, a correlation on the real world illustrated in FIG. 7 is equal to a correlation on the image captured by the imaging unit 122 depicted in FIG. 8. Hence, the following formula is to be established.

$$\frac{a}{W} = \frac{d + L\tan\theta}{L\tan\alpha} \qquad \text{[Mathematical Expression 1]}$$

where;

$$W = \frac{h}{\sin\varphi} \qquad \text{[Mathematical Expression 2]}$$

$$a = d + x \qquad \text{[Mathematical Expression 3]}$$

This formula is solved with respect to the distance L, whereby the following formula is obtained.

$$L = \frac{d}{\frac{a}{W}\tan\alpha - \tan\theta} \qquad \text{[Mathematical Expression 4]}$$

The distance L between the light beam impinging position A and the plane P1 is obtained from this formula.

The light beam impinging position on the image is extracted by taking a difference between the hand image captured by irradiating the light beam and the hand image captured by getting the illumination lit up. If the light beam impinging position on the image has a size, the center of the light beam impinging range on the image can be set as the light beam impinging position on the image.

The image acquiring unit 150 can calculate the distance by use of the light beam. The image acquiring unit 150 transmits the calculated distance L to the hand region distance calculation unit 220.

If plural types of light beams exist, the distance to the light beam impinging position A of the hand from the plane P1 may be calculated by employing at least any one type of light beam.

<<Calibration>>

Figure 9:
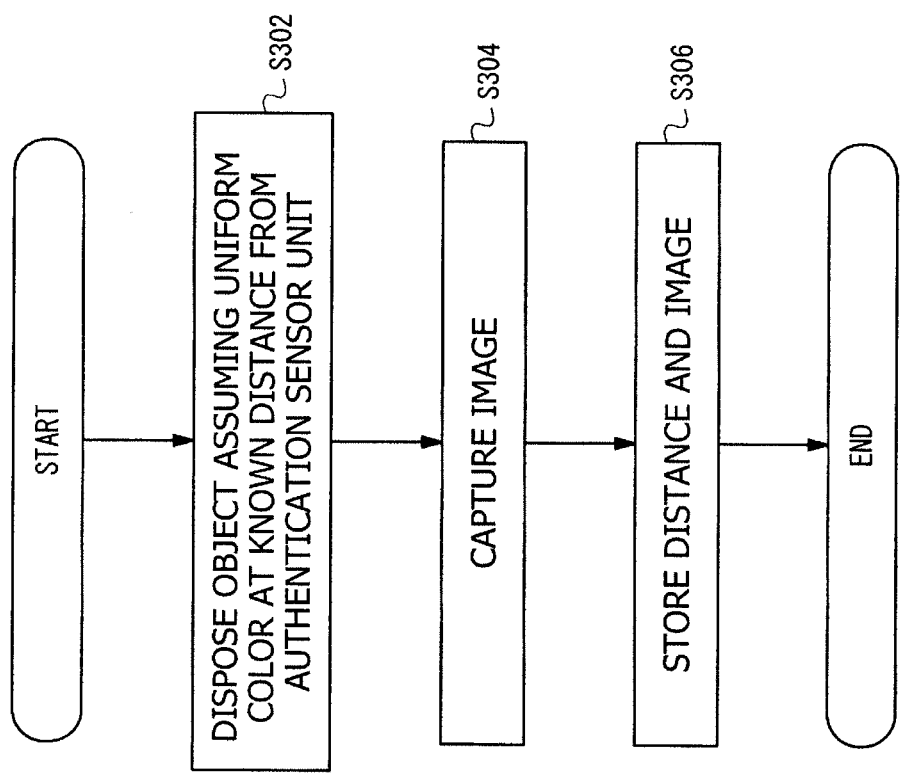
FIG. 9 is a flowchart illustrating an example of an operation flow of calibration of the authentication sensor unit.

FIG. 9 is a flowchart illustrating an operation flow of calibration of the authentication sensor unit.

The authentication sensor unit 100 performs, before calculating the distance up to the hand region, calibration as preprocessing.

An object (a calibration plane P3) assuming a uniform color is disposed at a known distance from the authentication sensor unit 100 (S302). An assumption is that a diffuse reflection coefficient of the calibration plane P3 is uniform on the plane P3. The illumination control unit 114 instructs the illumination unit 112 to get the illumination lit up. The imaging control unit 124 instructs the imaging unit 122 to capture the image of the object. The imaging unit 122 captures the image of the object (S304). The image acquiring unit 150 stores the known distance and the captured image in the hand region distance calculation unit 220 (S306). The intensity of each point on the image can be calculated from the capture image.

<<Calculation of Distance to Hand Region>>

Figure 10:
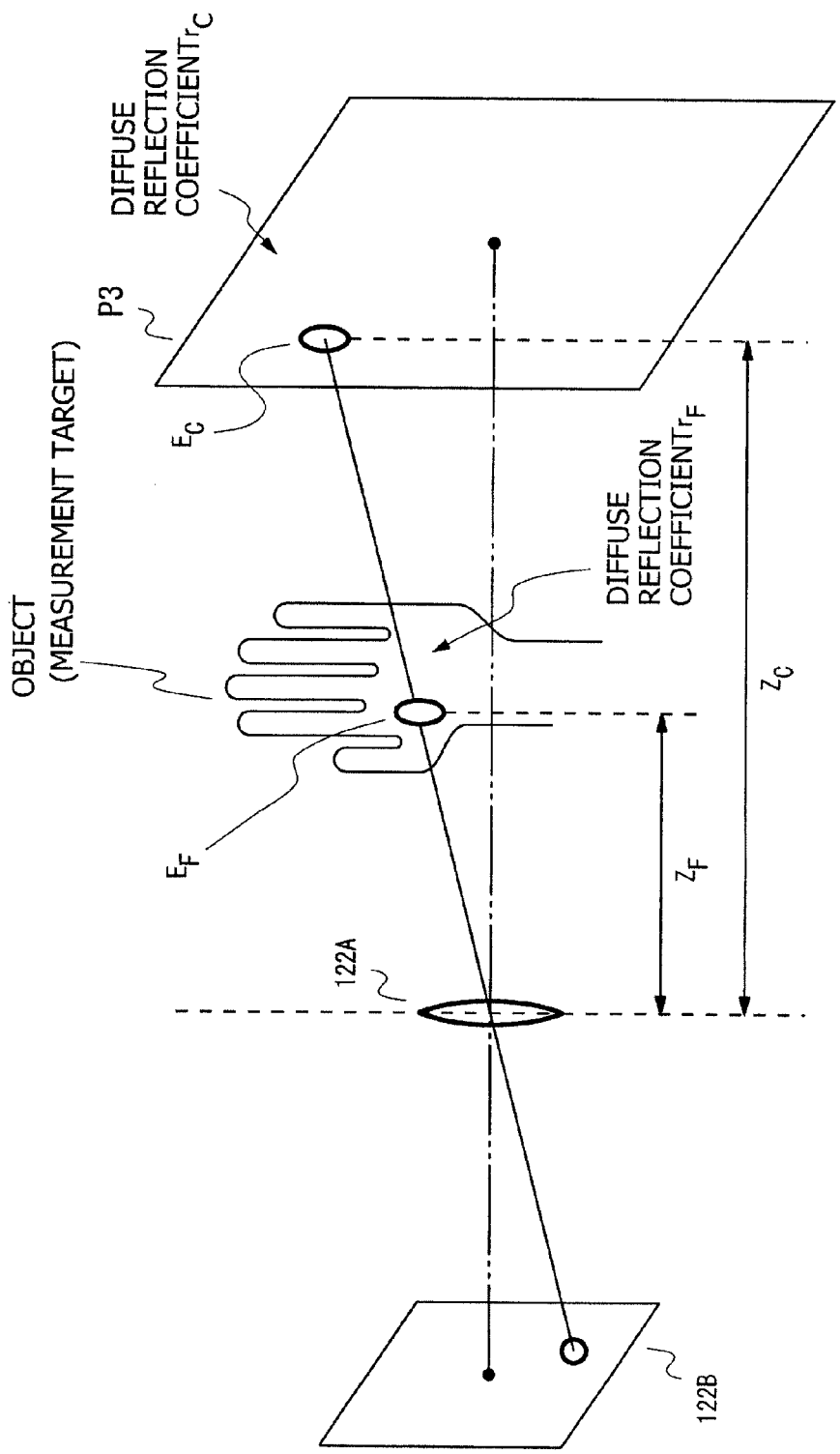
FIG. 10 is an explanatory diagram of how a distance to a hand region is calculated.

FIG. 10 is an explanatory view of how the distance to the hand region is calculated. The hand region distance calculation unit 220 calculates the distances between the plane on which the imaging unit 122 and the light beam source exist and all of the points of the hand region on the captured image.

The hand region is extracted by the hand region extracting unit 210.

Let $Z_C$ be a distance between the center C of the lens of the imaging unit 122 and the calibration plane P3. It is assumed that the distance $Z_C$ is a known value. Let $r_C$ be a diffuse reflection coefficient of the calibration plane P3. The diffuse reflection coefficient $r_C$ of the calibration plane P3 may be either a known value or an unknown value. If the diffuse reflection coefficient $r_C$ of the calibration plane P3 is unknown, the diffuse reflection coefficient $r_C$ of the calibration plane P3 can be calculated, based on such a point that the intensity (brightness) attenuates in inverse proportion to a square of the distance, by use of the image captured in the calibration. Let $E_C$ be an intensity, on the calibration plane P3, of the image captured on the occasion of the calibration. Generally the intensity $E_C$ differs depending on the position on the image.

Let $Z_F$ be a distance between the plane orthogonal to the optical axis of the lens of the imaging unit 122 and passing through the center of the lens and a certain point existing on an object (the internal side of the hand). Let $E_F$ be an intensity at a certain point of the object (the internal side of the hand). Let $r_F$ be a diffuse reflection coefficient of the object (the internal side of the hand) It is assumed that the diffuse reflection coefficient $r_F$ of the object (the internal side of the hand) is uniform over the internal side of the hand.

At this time, a ratio of the diffuse reflection coefficient $r_C$ of the calibration plane P3 to the diffuse reflection coefficient $r_F$ of the object (the internal side of the hand) is obtained as follows.

$$\frac{r_F}{r_C} = \frac{Z_F^2}{Z_C^2} \cdot \frac{E_F}{E_C} \qquad \text{[Mathematical Expression 5]}$$

Herein, the distance and the intensity are known. To use the distance up to the object (the internal side of the hand) that is calculated as the distance $Z_F$ by employing the light beam, the intensity $E_F$ is an intensity in the same position as the light beam impinging position with respect to the image captured by irradiating the light beam in the image captured in a manner that switches ON the light of the illumination unit 112. Further, the intensity $E_C$ to be used herein is an intensity in the same position as the light beam impinging position with respect to the image captured by irradiating the light beam in the image captured on the occasion of the calibration.

Moreover, the distance $Z_F$ between the plane orthogonal to the optical axis of the lens of the imaging unit 122 and passing through the center of the lens and an arbitrary point on the object (the internal side of the hand), is obtained by the following formula.

$$Z_F = \sqrt{\frac{r_F E_C}{r_C E_F}} Z_C \qquad \text{[Mathematical Expression 6]}$$

The intensity $E_F$ to be used herein is an intensity at the arbitrary point on the hand image captured by switching ON the light of the illumination unit 112. Further, the intensity $E_C$ to be used herein is an intensity in the same position as the arbitrary position on the image captured on the occasion of the calibration.

Through the setting described above, there are calculated the distances between the plane, on which the imaging unit 122 and the light beam source exist, orthogonal to the optical axis of the lens of the imaging unit 122 and all of the points of the hand region on the captured image. In other words, the hand region distance calculation unit 220 can calculate three-dimensional positions (distance map) of the respective point of the hand region.

The hand region distance calculation unit 220 may otherwise calculate the distance to the hand region.

The hand region distance calculation unit 220 calculates the distances to the hand region in the hand-expanded state and in the hand-bent state.

<Plane Normalization of Hand Region>

The hand region plane normalizing unit 230 normalizes the plane of the hand region in order to make a comparison between the plural hand shapes of one individual person.

<<Application of Model>>

The hand region plane normalizing unit 230 normalizes the plane after applying the three-dimensional shape of the hand region to the model.

The hand is three-dimensionally uneven (convex and concave) on the surface. A variety of persons have a variety of hand shapes. What is desirable is to measure the hand shapes of the variety of persons three-dimensionally, categorize the hand shapes and prepare a model representing each category. It is preferable that each model is expressed more specifically as an aggregation of voxels. The model based on the simplest expression is exemplified by a model in which a bowl-like shape is presumed for the hand and the hand is expressed by the elliptic paraboloid.

Herein, the shape of the hand region is applied to the elliptic paraboloid. A formula of the elliptic paraboloid is expressed as follows.

$$a(X-X_0)^2+b(Y-Y_0)^2+(Z-Z_0)=0 \quad \text{[Mathematical Expression 7]}$$

Herein, $(X_0, Y_0, Z_0)$ represents a coordinate of the center of the elliptic paraboloid. Further, "a" and "b" are coefficients.

The hand region plane normalizing unit 230 can obtain an equation of the elliptic paraboloid by an iterative approximation method, in which the three-dimensional positions of the respective points of the hand region that are calculated by the hand region distance calculation unit 220 are set as sampling points.

The three-dimensional positions of the respective points of the hand region that are calculated by the hand region distance calculation unit 220 serve as a set (aggregation) S. The hand region plane normalizing unit 230, with the set S defined as the sampling point, uses the iterative approximation method by which a tuple of a, b, $X_0$, $Y_0$, $Z_0$ from which the following formula is given can be obtained, in which a centroid of the hand region is given by $(X_0, Y_0, Z_0)$ and (a, b) calculated from arbitrary 2 points of the set S is used as an initial value.

$$\min \Sigma_{(X,Y,Z) \in S} \{a(X-X_0)^2+b(Y-Y_0)^2+(Z-Z_0)\} \quad \text{[Mathematical Expression 8]}$$

The hand region plane normalizing unit 230 obtains the elliptic paraboloid equation applied to the elliptic paraboloid with respect to the hand in the expanded state and the hand in the bent state.

<<Plane Normalization>>

Figure 11:
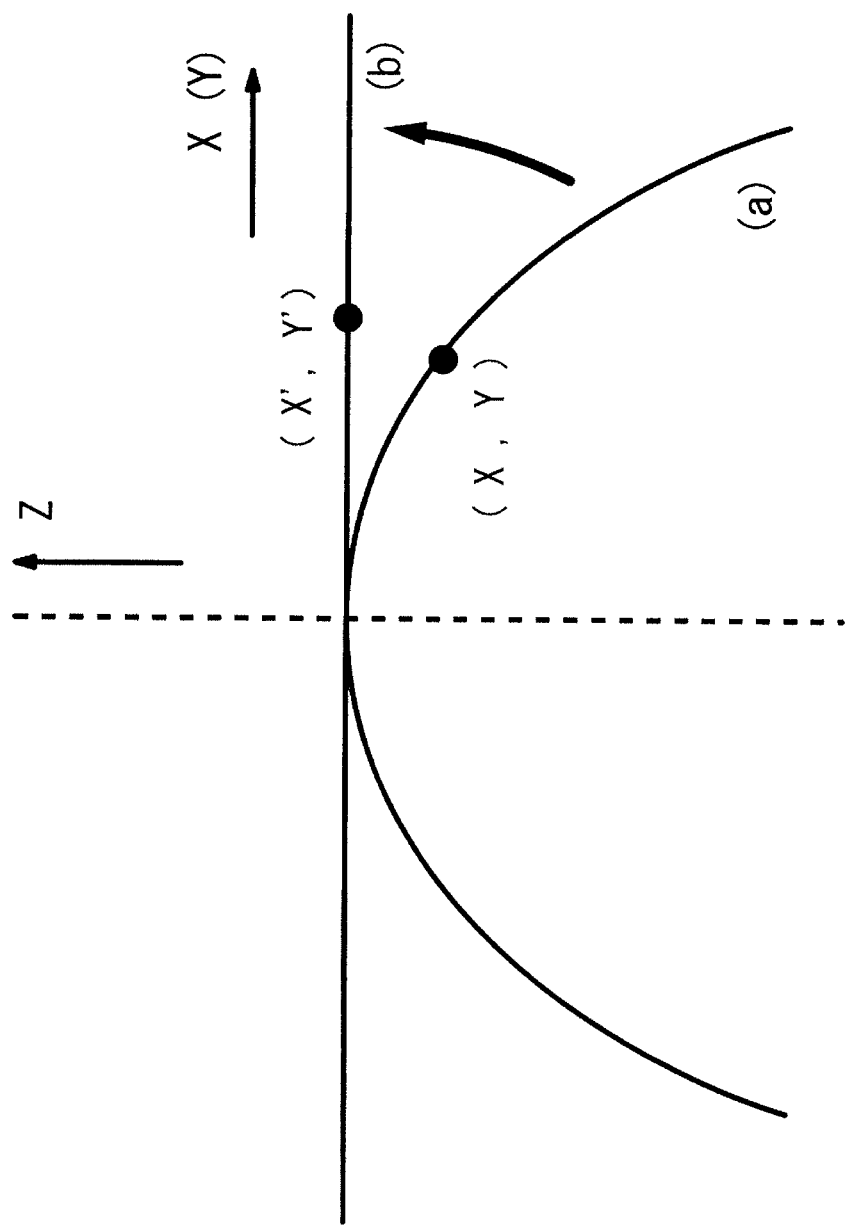
FIG. 11 is an explanatory diagram illustrating plane-normalization.

FIG. 11 is an explanatory diagram of the plane normalization. The plane normalization connotes changing the shape of the image so that the curved surface is stretched and expanded into a plane.

FIG. 11 represents a surface parallel with the Z-axis of the three-dimensional coordinate. The axis of ordinates in FIG. 11 indicates a direction parallel with the Z-axis direction. The axis of abscissa in FIG. 11 indicates a direction parallel with an X-axis or Y-axis direction. The symbol (a) in FIG. 11 represents a section of the elliptic paraboloid. Further, (b) in FIG. 11 represents a section of the plane orthogonal to the Z-axis.

The hand region plane normalizing unit 230 changes the shape of the curved surface into which the hand as given by (a) in FIG. 11 is applied to the elliptic paraboloid so as to become the plane as given by (b) in FIG. 11.

(X, Y) on the elliptic paraboloid to which the hand is applied is transformed into (X', Y') on the plane. Herein a relation between (X, Y) and (X', Y') is expressed as below.

[Mathematical Expression 9]

$$\theta = \tan^{-1} \frac{Y - Y_0}{X - X_0}$$

$$X' = X_0 + s\cos\theta$$

$$Y' = Y_0 + s\sin\theta$$

$$s = \lim_{N \to \infty} \sum_{i=0}^{N-1} \sqrt{(\Delta X)^2 + (\Delta Y)^2 + (2i+1)^2(\Delta Z)^2}$$

where;

[Mathematical Expression 10]

$$\Delta X = \frac{X - X_0}{N}$$

$$\Delta Y = \frac{Y - Y_0}{N}$$

$$\Delta Z = -a(\Delta X)^2 - b(\Delta Y)^2$$

Herein, "N" can be set to a finite number corresponding to performance of the computer.

The hand region plane normalizing unit 230 carries out the plane normalization with respect to the hand in the expanded state and the hand in the bent state.

<<Extraction of Dark Line and Extraction of Dark Line Element Characteristic>>

The dark line extracting unit 240 extracts the dark line from the hand region image undergoing the plane normalization in the hand region plane normalizing unit 230. The dark line corresponds to the linear portion exhibiting the low intensity as compared with the ambient intensity in the image of the hand region.

Figure 12:
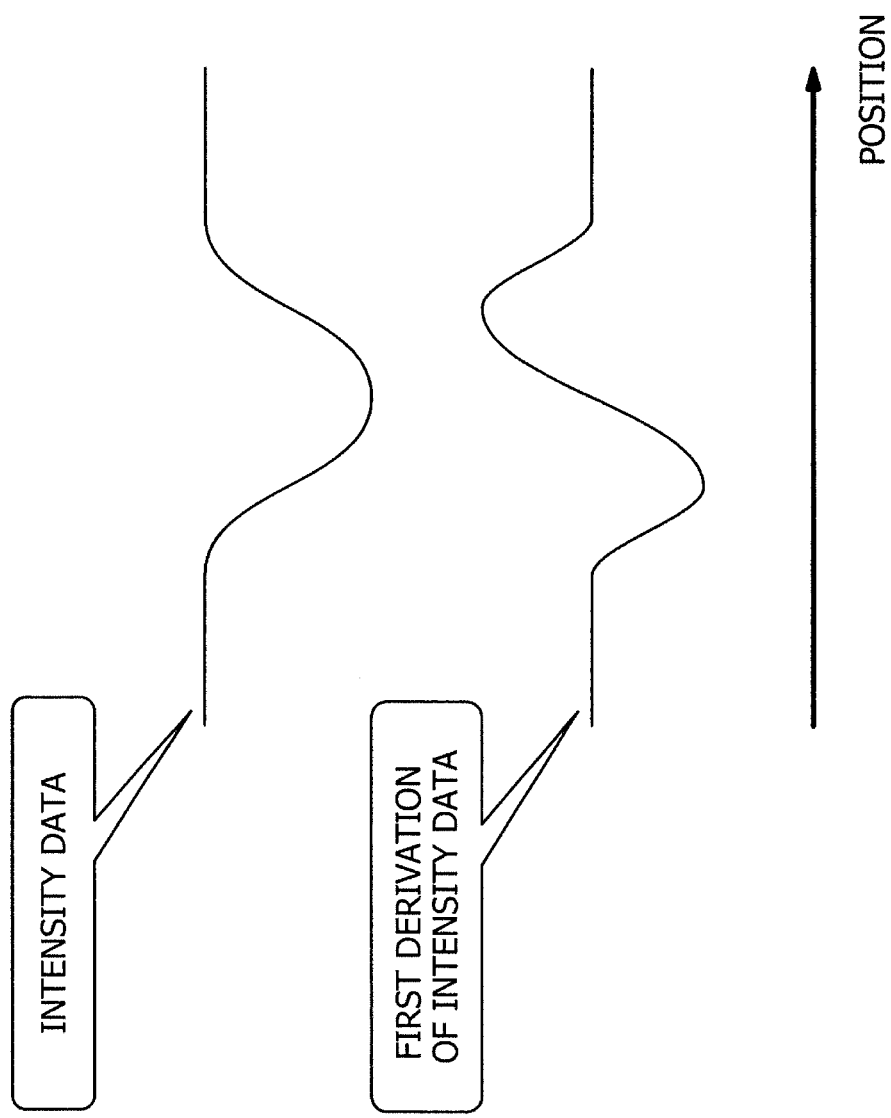
FIG. 12 is a graphic chart illustrating an example of first derivation based on a part of the dark line along a certain axis on the hand image undergoing the plane-normalization, a peripheral intensity and a position of the intensity.

FIG. 12 is a graphic chart illustrating an example of first derivation based on the portion of the dark line along a certain axis on the hand image undergoing the plane-normalization, the peripheral intensity and the position of the peripheral intensity. The axis of abscissa of the graph in FIG. 12 represents the position. The axis of ordinates of the graph in FIG. 12 represents the intensity or the first derivation of the intensity.

In the area of the dark line, as in the upper graph of FIG. 12, a portion of changing from a stable intensity (bright) exhibiting a relatively large value to an intensity (dark) exhibiting a relatively small value, is adjacent to a portion of changing from the intensity exhibiting the relatively small value to the intensity exhibiting the relatively large value.

The dark line extracting unit 240 obtains the difference in intensity between adjacent pixels by scanning the image of the hand region in the horizontal or vertical direction. The dark line extracting unit 240 searches a portion in which an accumulation value of the differential values between the intensities in such a section having a predetermined length that the intensity changes from bright to dark in the horizontal direction and in the vertical direction as well, is equal to or smaller than a predetermined value. The dark line extracting unit 240 can detect, as the dark line, the portion, spaced at a distance within a predetermined value in the positive direction from the pixel of the relevant portion, in which the accumulation value of the differential values between the intensities in such a section having the predetermined length that the intensity changes from dark to bright is equal to or larger than the predetermined value. The dark line extracting unit 240 may extract dark line otherwise.

The dark line extracting unit 240 extracts the dark line with respect to the hand in the expanded state and the hand in the bent state.

The dark line element characteristic extracting unit 250 extracts the dark line element characteristic of every dark line extracted by the dark line extracting unit 240. The types of the dark line element characteristics are exemplified by the width and the density of the dark line.

The position of the dark line can be expressed, in endpoints of one adjacent section of changing from bright to dark and of another adjacent section of changing from dark to bright, as a coordinate of a midpoint of the endpoints each closer to another section. The width of the dark line can be expressed by a distance between the center of one adjacent section of changing from bright to dark and the center of another adjacent section of changing from dark to bright. The density of the dark line can be expressed as an average of absolute values of the accumulation values of the differential values between the intensities of one adjacent section of changing from bright to dark and another adjacent section of changing from dark to bright. The dark line element characteristic extracting unit 250 may extract the dark line element characteristics by other methods.

The dark line element characteristic extracting unit 250 extracts the dark line element characteristics with respect to the hand in the expanded state and the hand in the bent state.

The dark line element characteristic extracting unit 250 generates an image of a two-dimensional array (image-format) in which the pixel in the dark-line-detected position is stored with a value of the density of the dark line. Further, the dark line element characteristic extracting unit 250 generates an image of the two-dimensional array (image-format) in which the pixel in the dark-line-detected position is stored with a value of the width of the dark line. The dark line element characteristic extracting unit 250 generates the images of the hand in the expanded state and the hand in the bent state.

Herein, the image stored with the value of the density of the dark line when the hand is expanded is assumed to be an image Id1. The image stored with the value of the width of the dark line when the hand is expanded is assumed to be an image Iw1. Further, the image stored with the value of the density of the dark line when the hand is bent is assumed to be an image Id2. The image stored with the value of the width of the dark line when the hand is bent is assumed to be an image Iw2.

<Determination of Surface Data>

The surface data determining unit 260 determines, from the variation in width of the dark line and the variation in density of the dark line, whether the dark line represents the surface data or not on the per-dark-line basis. Hence, the surface data determining unit 260 can extract the dark line defined as the surface data of the hand.

The internal side of the hand gets lined with the wrinkles by bending the internal side of the hand of the person. A surface area on an enveloping surface of the internal surface of the hand in the bent state is smaller than in the expanded state. The surface data determining unit 260 is capable of adjusting the sizes in the hand-expanded state and in the hand-bent state as well as aligning.

The surface data determining unit 260 makes the alignment and adjusts the sizes between the two images, i.e., the image Id1 and the image Id2. It is presumed that the coefficients on the occasion of approximating the elliptic paraboloid when the hand is expanded are (a1, b1, X01, Y01, X01) and the coefficients on the occasion of approximating the elliptic paraboloid when the hand is bent are (a2, b2, X02, Y02, X02). The surface data determining unit 260 shifts the image Id2 by −(X02−X01) and −(Y02−Y01) in the X-axis direction and the Y-axis direction. What the image Id 2 is thus shifted is assumed to be an image Id2'. Let A1 be an area of the hand region (the number of pixels contained in the hand region) of the image after normalizing the plane when the hand is expanded, and let A2 be an area of the hand region of the image after normalizing the plane when the hand is bent. The surface data determining unit 260 performs $(A1/A2)^{1/2}$-fold enlargement and shrinkage of the image Id2' with (X01, Y01) being centered. What the image Id 2' is thus enlarged and shrunk is assumed to be an image Id2".

Similarly, the surface data determining unit 260 makes the alignment and adjusts the sizes between the two images, i.e., the image Iw1 and the image Iw2. The surface data determining unit 260 obtains an image Iw2' and an image Iw2" by executing the same operations as above.

The surface data determining unit 260 obtains a dark line density variation Δd=Id2" (x, y)−Id1 (w, y) and a dark line width variation Δw=Iw2" (x, y)−Iw1 (w, y) for the pixels each having the output in the same coordinate (w, y) with respect to the images Id1, Id2", Iw1, Iw2".

The surface data determining unit 260 reads a condition determined to be the surface data from the surface change data storage unit 270. The surface change data storage unit 270 is stored with the conditions for determining the element as the wrinkle if a change in density of the dark line is, e.g., positive and if a change in width of the dark line is negative. At this time, the surface data determining unit 260 determines, when Δd>0 and Δw<0, the dark line to be the surface data. While on the other hand, the surface data determining unit 260 determines, when Δd<0 or Δw>0, the dark line not to be the surface data.

Figure 13:
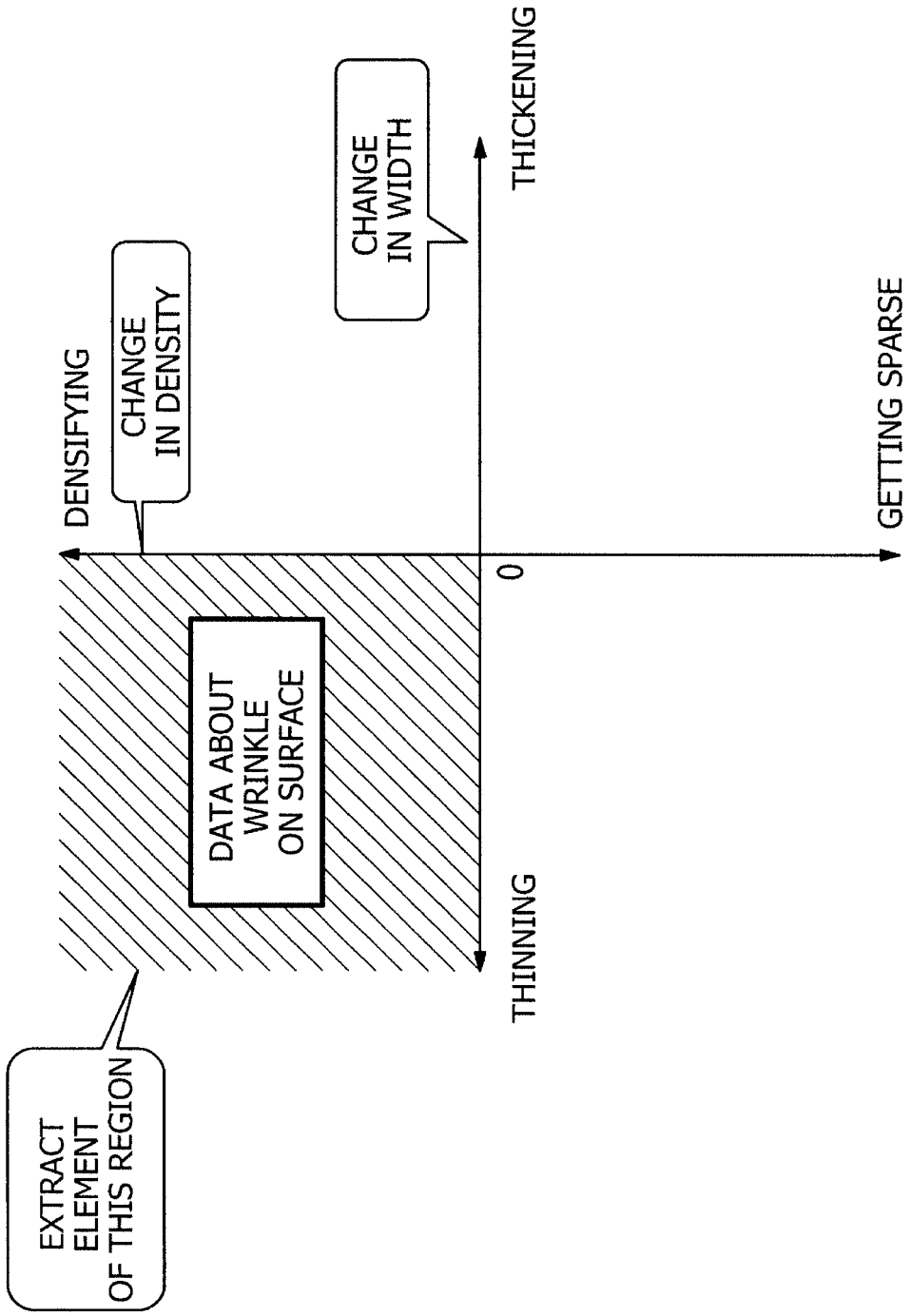
FIG. 13 is a diagram illustrating an example of a criterion for determining surface data.

FIG. 13 is a diagram illustrating an example of a criterion for determining the surface data. In the example of FIG. 13, if the change in density of the dark line is in a densifying direction and if the change in width of the dark line is in a thinning direction, the dark line is determined to be the data (surface data) about the surface wrinkle.

The surface data determining unit 260 stores the dark line data determined to be the surface data in the live surface characteristic storage unit 280. The surface data determining unit 260 can store the live surface characteristic storage unit 280 with the position data of the dark line that is determined to be the surface data.

The surface data determining unit 260 can, if the captured image of the hand does not show any existence of the dark line recognized as the surface data, determine the imaged hand as a fake. This is because it is considered that the hand surface data derived from the hand wrinkle exists in the case of the living organism.

The hand surface data stored in the live surface characteristic storage unit 280 can be utilized as the identification information of an individual on the occasion of the biometric authentication.

The live surface characteristic storage unit 280 can be stored beforehand with items of hand surface data of known persons. In this case, the individual can be identified by matching the surface data of the captured hand image against the hand surface data stored in the live surface characteristic storage unit 280. The live surface characteristic storage unit 280 can be stored with the hand surface data of a plurality of persons and the identification information of these persons in the way of being associated with each other.

Applied Examples

Palmar pattern data defined as the surface data of the palm can be utilized by way of palmar pattern authentication as one technique of the biometric authentication. The biometric authentication device including the biometric data acquiring device is previously stored with the palmar pattern data on a user-by-user basis, and compares the hand surface data (palmar pattern data) acquired by imaging the user's hand with the pre-stored palmar pattern data, thereby enabling the biometric authentication to be conducted.

Moreover, the biometric authentication device can be configured by combining the biometric authentication based on the surface data of the palm with the palm vein authentication categorized as the biometric authentication that is similarly targeted at the palm. In this case, the authentication sensor unit 100 in the embodiment can be employed as the authentication sensor for the vein authentication.

Figure 14:
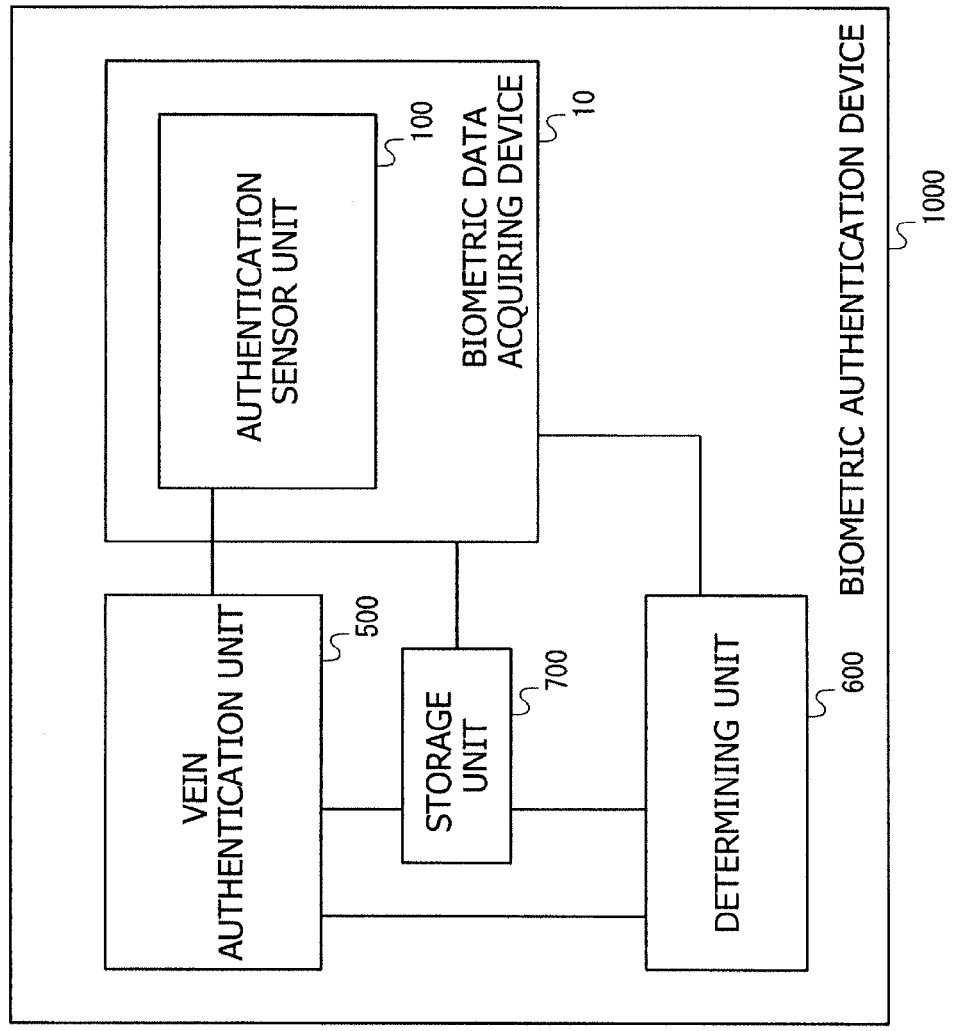
FIG. 14 is a block diagram illustrating an example of a biometric authentication device.

FIG. 14 is a block diagram illustrating an example of the biometric authentication device. A biometric authentication device 1000 in FIG. 14 includes a biometric data acquiring device 10 having an authentication sensor unit 100, a vein authentication unit 500 and a determining unit 600. The biometric authentication device 1000 may further include a storage unit 700.

The biometric data acquiring device 10 captures the image of the palm and extracts the surface data of the palm. The biometric data acquiring device 10 conducts the biometric authentication by use of the extracted surface data of the palm. Moreover, the biometric data acquiring device 10, if disabled from acquiring the surface data of the palm, determines the imaged palm to be a fake. The biometric data acquiring device 10 transmits, to the determining unit 600, at least one of a result of the biometric authentication based on the surface data of the palm and a result of determining whether the object is the living organism or not. The biometric data acquiring device 10 in FIG. 14 has the same configuration and the same function as leastwise the biometric data acquiring device 10 in FIG. 1 has. The biometric data acquiring device 10 can extract the surface data of the single or plural palms, which are similar to the palm surface data extracted from the captured image and pre-stored in the live surface characteristic storage unit 280 etc.

The vein authentication unit 500 performs the biometric authentication based on the vein data of the palm in a manner that employs the palm image captured by the authentication sensor unit 100. The vein authentication unit 500 can extract the vein data of the palm from the palm image captured by the authentication sensor unit 100. The vein authentication unit 500 transmits the result of the biometric authentication based on the vein data of the palm to the determining unit 600. The vein authentication unit 500 can conduct the biometric authentication based on the vein data by use of the image captured in the palm-expanded state. The vein authentication unit 500 can extract the vein data of the palm from the image captured in the palm-expanded state.

The vein authentication unit 500 can be stored beforehand with the vein data of the palm of a known person. The vein authentication unit 500 can perform the biometric authentication by matching the vein information extracted from the captured image against the stored vein data. The vein authentication unit 500 can be stored with the vein data of the palms of the plurality of persons and pieces of identification information of these persons in the way of being associated with each other.

The vein authentication unit 500 can execute a process of matching the vein data associated with the single or plural palms that are extracted by the biometric data acquiring device 10 against the palm vein data extracted from the captured image.

The determining unit 600 can carryout the authentication on the basis of the result of the biometric authentication based on the palm surface data, the result of determining from the palm surface data whether the object is the living organism or not and the result of the biometric authentication based on the palm vein data. The determining unit 600 can authenticate an identity when the authentication becomes successful (authentication OK) in the biometric authentication based on the palm surface data and when the authentication becomes successful (authentication OK) in the biometric authentication based on the palm vein data.

The storage unit 700 can be stored with the palm surface data of the user, the palm vein data of the user and the identification information of the user in the way of being associated with each other. The storage unit 700 can be stored beforehand with these items of data of the plurality of users. The biometric data acquiring device 10 and the vein authentication unit 500 each may acquire the palm surface data and the palm vein data from the storage unit 700. The storage unit 700 is stored with the palm surface data of the user, the palm vein data of the user and the identification information of the user in the way of being associated with each other, in which case the biometric data acquiring device 10 and the vein authentication unit 500 may not be stored with these items of data.

The palmar pattern data is the data about the surface of the body, and by contrast the palm vein data is the in-vivo data. Accordingly, there is basically no relation between these two categories of data. Therefore, the data about one individual person rises in quantity, and the use of both these two categories of data enables realization of the individual authentication with further enhanced accuracy of the individual identification in the palm vein authentication at the present. Namely, when the identity of the person, whose palmar pattern data and the palm vein data are both coincident, is confirmed, the accuracy of the individual identification increases.

Moreover, the palmar pattern authentication can be also utilized for reducing the time for the palm vein authentication. The palm vein authentication exhibits the high accuracy of the individual identification but has a large quantity of data per head and an elongated period of time for matching. Accordingly, if the items of palm vein data inputted for the individual identifying process are to be matched against the data of all of the registered persons, several tens of seconds are expended as the case may be. Hence, in terms of a human interface, there is a possibility that a man might feel disagreeable when waiting for the authentication result. Such being the case, a plurality of persons having similar palmar pattern data (palm surface data) is previously selected from within all of the registered persons, and the palm vein authentication can be applied to these plural persons.

The palmar pattern data has a smaller quantity of data than the palm vein data has, and hence the accuracy of the individual identification is inferior if the palmar pattern data is utilized solely for the biometric authentication. The palmar pattern authentication has the small quantity of data and therefor enables the time expended for matching to be reduced. Accordingly, the matching in the biometric authentication based on the palmar pattern data and the palm vein data can be realized in a shorter period of time than the matching time in the sole palm vein authentication. Further, the biometric authentication based on the palmar pattern data and the palm vein data enables the realization the individual identifying process equivalent to the palm vein authentication.

(Operational Effect of Embodiment)

According to the embodiment, the palm surface data can be extracted by capturing the image of the palm in the expanded state and in the bent state. According to the embodiment, the biometric authentication can be conducted by use of the thus-extracted palm surface data.

Moreover, according to the embodiment, the palmar pattern authentication and the vein authentication can be carried out by employing the image captured by the same authentication sensor. According to the embodiment, the biometric authentication is conducted by using the palm surface data and the palm vein data that are not related to each other, whereby the individual identifying process with the much higher accuracy can be realized.

What is claimed is:

1. A biometric data acquiring device comprising:
an imaging unit to acquire a first image of an internal side of a user's hand captured in a first state in which the internal side of the hand is stretched, and a second image of the internal side of the user's hand captured in a state in which the internal side of the hand is bent;
a dark line extracting unit to extract dark lines from the first image and the second image, respectively;
a dark line element characteristic extracting unit to extract a characteristic of an element of the dark line in the first image and a characteristic of an element of the dark line in the second image; and
a surface data determining unit to extract the dark line derived from a wrinkle formed based on bending and stretching the hand on the basis of transitions of the characteristics of the elements of the dark lines in the first image and the second image.

2. A biometric data acquiring device according to claim 1, wherein said dark line element characteristic extracting unit extracts a density and a width of the dark line in the first image and a density and a width of the dark line in the second image, and
said surface data determining unit determines the dark line as the dark line derived from the wrinkle on the hand with respect to the dark lines of the first image and the second image in the same position if the density of the dark line of the second image is thicker than the density of the dark line of the first image and the width of the dark line of the second image is smaller than the width of the dark line of the first image.

3. A biometric data acquiring device according to claim 1, wherein said surface data determining unit determines, if the dark lines extracted from the first image and the second image contain the dark lines derived from the wrinkles formed based on bending and stretching the hand, that the first image and the second image are obtained by imaging a living organism.

4. A biometric authentication device comprising:
an imaging unit to acquire a first image of an internal side of a user's hand captured in a first state in which the internal side of the hand is stretched, and a second image of the internal side of the user's hand captured in a state in which the internal side of the hand is bent;
a dark line extracting unit to extract dark lines from the first image and the second image, respectively;
a dark line element characteristic extracting unit to extract a characteristic of an element of the dark line in the first image and a characteristic of an element of the dark line in the second image; and
a surface data determining unit to extract the dark line derived from a wrinkle formed based on bending and stretching the hand on the basis of transitions of the characteristics of the elements of the dark lines in the first image and the second image, and to execute a process of matching the extracted piece of dark line derived from the wrinkle on the hand against a pre-registered dark line derived from the wrinkle on the hand that is associated with the user.

5. A biometric authentication device according to claim 4, wherein said dark line element characteristic extracting unit extracts a density and a width of the dark line in the first image and a density and a width of the dark line in the second image, and
said surface data determining unit determines the dark line as the dark line derived from the wrinkle on the hand with respect to the dark lines of the first image and the second image in the same position if the density of the dark line of the second image is thicker than the density of the dark line of the first image and the width of the dark line of the second image is smaller than the width of the dark line of the first image.

6. A biometric authentication device according to claim 4, further comprising:
a vein data determining unit to execute a process of extracting vein data of the hand from the first image and matching the vein data against pre-registered vein data of the hand that is associated with the user; and
a determining unit to authenticate the user if a matching result of said surface data determining unit proves to be normal and a matching result of said vein data determining unit proves to be normal but not to authenticate the user whereas if not.

7. A biometric authentication device comprising:
a storage unit to be stored with pieces of identification information of a plurality of users, surface data of dark lines derived from wrinkles formed based on bending and stretching the hands and vein data of the hands in the way of being associated with each other;
an imaging unit to acquire a first image of an internal side of a user's hand captured in a first state in which the internal side of the hand is stretched, and a second image of the internal side of the user's hand captured in a state in which the internal side of the hand is bent;
a dark line extracting unit to extract the dark lines from the first image and the second image, respectively;
a dark line element characteristic extracting unit to extract a characteristic of an element of the dark line in the first image and a characteristic of an element of the dark line in the second image;
a surface data determining unit to extract the dark line derived from the wrinkle on the hand on the basis of transitions of the characteristics of the elements of the dark lines in the first image and the second image, to execute a process of matching the extracted dark line derived from the wrinkle on the hand against the dark line derived from the wrinkle on the hand that is stored in said storage unit, and to extract the surface data of the dark line derived from the wrinkle on the hand that is similar to the extracted dark line derived from the wrinkle on the hand and stored in said single or plural storage units;
a vein data determining unit to execute a process of extracting vein data of the hand from the first image and matching the extracted vein data against the hand vein data associated with the surface data of the dark line derived from the wrinkle on the single or plural hands that are extracted by said surface data determining unit from said storage unit; and
a determining unit to authenticate the user if a matching result of said vein data determining unit proves to be normal but not to authenticate the user whereas if not.

8. A biometric authentication device according to claim 7, wherein said dark line element characteristic extracting unit extracts a density and a width of the dark line in the first image and a density and a width of the dark line in the second image, and
said surface data determining unit determines the dark line as the dark line derived from the wrinkle on the hand with respect to the dark lines of the first image and the second image in the same position if the density of the dark line of the second image is thicker than the density of the dark line of the first image and the width of the dark line of the second image is smaller than the width of the dark line of the first image.

* * * * *